(12) United States Patent
Ji et al.

(10) Patent No.: US 11,218,684 B2
(45) Date of Patent: Jan. 4, 2022

(54) METHOD AND APPARATUS FOR CONTROLLING IMAGE DISPLAY

(71) Applicant: BEIJING XIAOMI MOBILE SOFTWARE CO., LTD., Beijing (CN)

(72) Inventors: Jiasong Ji, Beijing (CN); Xingsheng Lin, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 83 days.

(21) Appl. No.: 16/513,142

(22) Filed: Jul. 16, 2019

(65) Prior Publication Data
US 2020/0036957 A1    Jan. 30, 2020

(30) Foreign Application Priority Data

Jul. 25, 2018 (CN) .......................... 201810828904.1

(51) Int. Cl.
*H04N 13/167* (2018.01)
*H04N 13/194* (2018.01)
(Continued)

(52) U.S. Cl.
CPC ......... *H04N 13/167* (2018.05); *H04N 13/194* (2018.05); *H04N 13/243* (2018.05);
(Continued)

(58) Field of Classification Search
CPC .. H04N 13/167; H04N 13/194; H04N 13/271; H04N 13/282; H04N 13/332;
(Continued)

(56) References Cited

U.S. PATENT DOCUMENTS

2002/0075286 A1    6/2002  Yonezawa et al.
2003/0067536 A1*   4/2003  Boulanger ........... H04N 13/243
                                                      348/14.08
(Continued)

FOREIGN PATENT DOCUMENTS

CN        102891915 A     1/2013
CN        103337079 A    10/2013
(Continued)

OTHER PUBLICATIONS

European Patent Office, Extended European Partial Search Report issued in EP Application No. 19187910.5 dated Dec. 10, 2019, and English translation, (15p).
(Continued)

*Primary Examiner* — Tat C Chio
(74) *Attorney, Agent, or Firm* — Arch & Lake LLP

(57) ABSTRACT

A method of controlling image display includes: receiving an image capture instruction from a client device, wherein the image capture instruction includes a photographing direction, and the photographing direction is determined by the client device according to a relative position relationship between a position of the client device and a user-specified display position; controlling an image capture device to perform image capture according to the photographing direction, to obtain a depth image comprising a target object image; extracting the target object image from the depth image; and sending the target object image to the client device such that the client device displays the target object image at the display position.

9 Claims, 7 Drawing Sheets

(51) Int. Cl.
  *H04N 13/271* (2018.01)
  *H04N 13/282* (2018.01)
  *H04N 13/332* (2018.01)
  *H04N 13/243* (2018.01)
(52) U.S. Cl.
  CPC ......... *H04N 13/271* (2018.05); *H04N 13/282* (2018.05); *H04N 13/332* (2018.05)
(58) Field of Classification Search
  CPC ............. H04N 13/243; H04N 21/2387; H04N 21/816; H04N 21/6587; H04N 21/4728; H04N 13/117; H04N 13/344; H04N 2013/0092; H04N 7/18
  See application file for complete search history.

(56) References Cited

U.S. PATENT DOCUMENTS

| | | | |
|---|---|---|---|
| 2011/0261050 A1 | 10/2011 | Smolic et al. | |
| 2017/0053167 A1 | 2/2017 | Ren et al. | |
| 2019/0339840 A1* | 11/2019 | Park | G02B 27/017 |

FOREIGN PATENT DOCUMENTS

| | | | | |
|---|---|---|---|---|
| CN | 104102678 A | 10/2014 | | |
| CN | 104735542 A | 6/2015 | | |
| CN | 105955456 A | 9/2016 | | |
| CN | 106170082 A | 11/2016 | | |
| EP | 3547672 A1 * | 10/2019 | ............. | H04N 7/152 |
| EP | 3547672 A1 | 10/2019 | | |
| KR | 20130107981 A | 10/2013 | | |
| WO | 2018095317 A1 | 5/2018 | | |
| WO | WO-2018095317 A1 * | 5/2018 | ............. | H04N 7/147 |

OTHER PUBLICATIONS

First Office Action and Search Report Issued in Chinese Patent Application No. 201810828904.1 dated Jun. 12, 2019, with English Machine Translation, (17p).

Extended European Search Report issued in EP Application No. 19187910.5 dated Apr. 22, 2020, (198p).

* cited by examiner

METHOD AND APPARATUS FOR CONTROLLING IMAGE DISPLAY

CROSS REFERENCE TO RELATED APPLICATIONS

This application claims priority to Chinese Patent Application No. 201810828904.1 entitled "METHOD AND APPARATUS FOR CONTROLLING IMAGE DISPLAY" filed on Jul. 25, 2018, the entire content of which is incorporated herein by reference.

TECHNICAL FIELD

The present disclosure relates to the field of Internet technology, and in particular to a method and an apparatus for controlling image display.

BACKGROUND

With development of science and technology, stereoscopic display technology has emerged to meet higher requirements of people for a visual effect of image display. The stereoscopic display technology may display a depth image to achieve a three-dimensional visual effect. Compared to a two-dimensional image, the depth image has a more detailed and vivid display effect and a larger data volume.

SUMMARY

To solve problems existing in the related art, an example of the present disclosure provides a method and an apparatus for controlling image display.

A first aspect of the present disclosure provides a method of controlling image display. The method may include: receiving an image capture instruction from a client device, where the image capture instruction includes a photographing direction, and the photographing direction is determined by the client device according to a relative position relationship between a position of the client device and a user-specified display position; controlling an image capture device to perform image capture according to the photographing direction, to obtain a depth image comprising a target object image; extracting the target object image from the depth image; and sending the target object image to the client device so that the client device displays the target object image at the display position.

A second aspect of the present disclosure provides a method of controlling image display, which includes: receiving a control instruction including a user-specified display position; obtaining a photographing direction for photographing a target object according to the display position and a corresponding relationship between the display position and the photographing direction, where the photographing direction is determined according to a relative position relationship between a position of a client device and the display position; sending an image capture instruction to a server according to the photographing direction so that the server obtains a depth image including a target object image according to the image capture instruction and extract the target object image from the depth image; and receiving the target object image from the server and displaying the target object image at the display position.

A third aspect of the present disclosure provides an apparatus for controlling image display, which includes a processor and a memory. The memory is used to store a computer program. The processor is used to execute the computer program stored on the memory, and is configured to: receive an image capture instruction from a client device, where the image capture instruction includes a photographing direction, and the photographing direction is determined by the client device according to a relative position relationship between a position of the client device and a user-specified display position; control an image capture device to perform image capture according to the photographing direction, to obtain one depth image including a target object image; extract the target object image from the depth image; and send the target object image to the client device so that the client device displays the target object image at the display position.

A fourth aspect of the present disclosure provides an apparatus for controlling image display, which includes a processor and a memory. The memory is used to store a computer program. The processor is used to execute the computer program stored in the memory, and is configured to: receive a control instruction including a user-specified display position; obtain a photographing direction for photographing a target object according to the display position and a corresponding relationship between the display position and the photographing direction, where the photographing direction is determined according to a relative position relationship between a position of a client device and the display position; send an image capture instruction to a server according to the photographing direction so that the server obtains a depth image including the target object image according to the image capture instruction and extract the target object image from the depth image; and receive the target object image from the server and display the target object image at the display position.

A fifth aspect of the present disclosure provides a computer readable storage medium storing a computer program, and the computer program is executed by a processor to implement the method described in the above first aspect.

A sixth aspect of the present disclosure provides a computer readable storage medium storing a computer program, and the computer program is executed by a processor to implement the method described in the above second aspect.

It is to be understood that the above general descriptions and the below detailed descriptions are merely exemplary and explanatory, and are not intended to limit the present disclosure.

BRIEF DESCRIPTION OF DRAWINGS

The accompanying drawings herein, which are incorporated in and constitute a part of the present description, illustrate examples consistent with the present disclosure and serve to explain the principles of the present disclosure together with the description.

DETAILED DESCRIPTION

Figure 1:
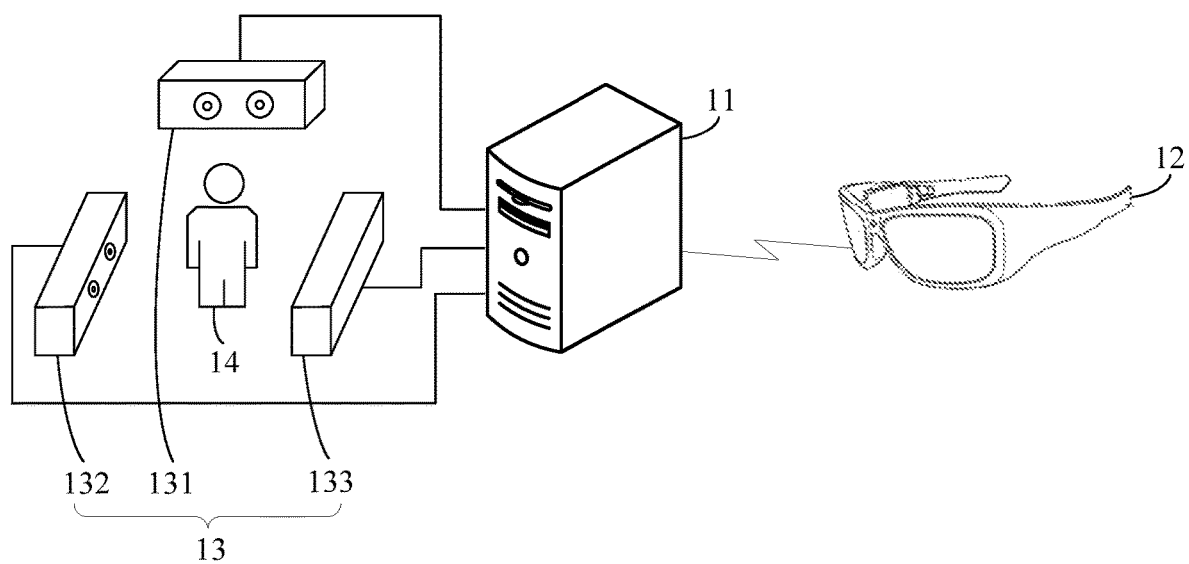
FIG. 1 is a schematic diagram illustrating an application scenario of a method of controlling image display according to an example of the present disclosure.

Exemplary embodiments will be described in detail herein with the examples thereof expressed in the drawings. When the following descriptions involve the drawings, like numerals in different drawings represent like or similar elements unless stated otherwise. Implementations described in the following examples do not represent all implementations consistent with the present disclosure. On the contrary, they are examples of an apparatus and a method consistent with some aspects of the present disclosure described in detail in the appended claims.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may be understood to mean "when" or "upon" or "in response to" depending on the context.

Reference throughout this specification to "one example," "an example," "exemplary example," or the like in the singular or plural means that one or more particular features, structures, or characteristics described in connection with an example is included in at least one example of the present disclosure. Thus, the appearances of the phrases "in one example" or "in an example," "in an exemplary example," or the like in the singular or plural in various places throughout this specification are not necessarily all referring to the same example. Furthermore, the particular features, structures, or characteristics in one or more examples may include combined in any suitable manner.

FIG. 1 is a schematic diagram illustrating an application scenario of a method of controlling image display according to an example of the present disclosure. In the application scenario shown in FIG. 1, a client device 12 is in communication with a server 11, and the server 11 is in communication with an image capture device 13. A user may send a control instruction to the server 11 through the client device 12, and the server 11 may obtain a depth image including an image of a target object 14 by controlling the image capture device 13 to perform image capture for the target object 14 according to the control instruction received from the client device 12. The image capture device 13 may upload the captured depth image to the server 11. The server 11 may extract the image of the target object (hereinafter referred to as a target object image) from the depth image and send the target object image to the client device 12 for display.

Figure 2:
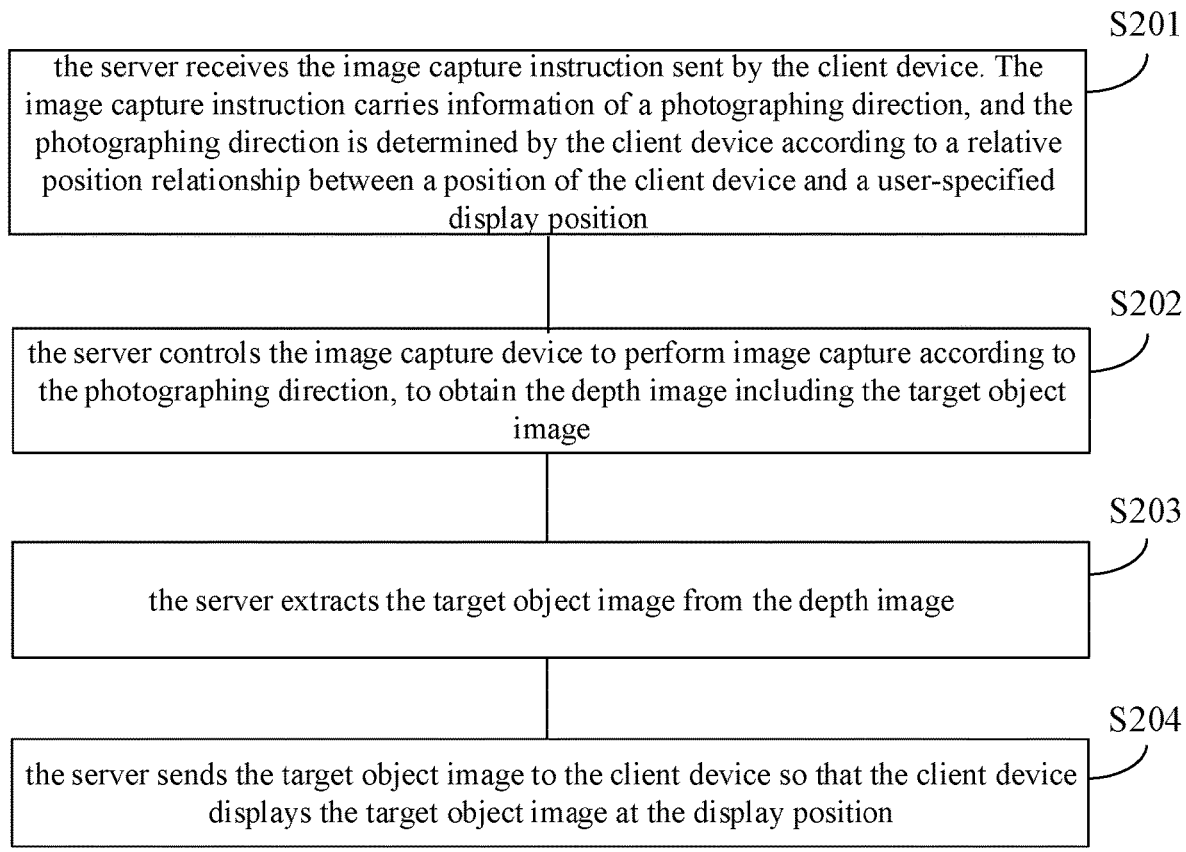
FIG. 2 is a flowchart illustrating a method of controlling image display executed by a server according to an example of the present disclosure.
Figure 3:
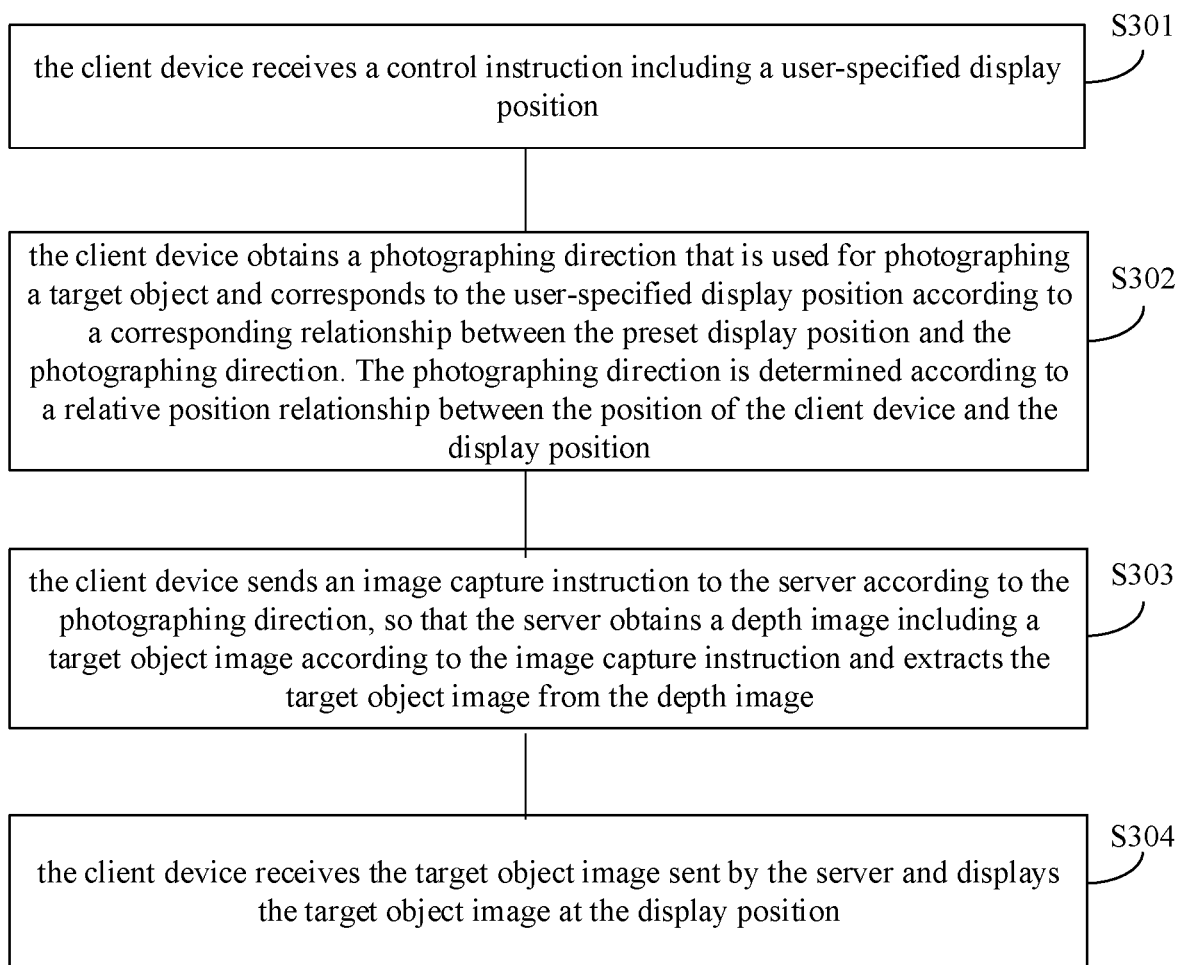
FIG. 3 is a flowchart illustrating a method of controlling image display executed by a client device according to an example of the present disclosure.

FIG. 2 is a flowchart illustrating a method of controlling image display executed by a server 11 according to an example of the present disclosure. FIG. 3 is a flowchart illustrating a method of controlling image display executed by a client device 12 according to an example of the present disclosure. With reference to FIG. 1, as shown in FIG. 2 and FIG. 3, the method of controlling image display includes at least the following acts as illustrated in blocks S201 to S204 and S301 to S304.

At block S201, the server 11 receives the image capture instruction sent by the client device 12. The image capture instruction includes a photographing direction, and the photographing direction is determined by the client device 12 according to a relative position relationship between a position of the client device 12 and a user-specified display position.

At block S202, the server 11 controls the image capture device 13 to perform image capture according to the photographing direction, to obtain the depth image including the target object image.

At block S203, the server 11 extracts the target object image from the depth image.

At block S204, the server 11 sends the target object image to the client device 12 so that the client device 12 displays the target object image at the display position.

At block S301, the client device 12 receives a control instruction including a user-specified display position.

At block S302, the client device 12 obtains a photographing direction that is used for photographing a target object and corresponds to the user-specified display position according to a corresponding relationship between the preset display position and the photographing direction. The photographing direction is determined according to a relative position relationship between the position of the client device 12 and the display position.

At block S303, the client device 12 sends an image capture instruction to the server 11 according to the photographing direction, so that the server 11 obtains a depth image including a target object image according to the image capture instruction and extracts the target object image from the depth image.

At block S304, the client device 12 receives the target object image sent by the server 11 and displays the target object image at the display position.

The order of the above acts is not limited. For example, the order does not need to follow the steps as illustrated. The acts corresponding to blocks S301-S303 may be performed before the act correspond to block S201.

In an example, the client device 12 may provide a display scenario for displaying the target object image. For example, the user may set a display position of the target object image in the display scenario through the client device 12. In a case that the display scenario is an image captured for a place where the user is located, the display position is a position that is specified by the user to display the target object image in the display scenario, and corresponds to an actual position in the place where the user is located. For example, if the target object 14 is a speaker in a lecture hall, the target object image is a depth image (holographic image) of the speaker 14, and the client device 12 is Augmented Reality (AR) glasses, when the user sits on a seat in another lecture hall and faces a lecture stage after wearing the AR glasses 12, the AR glasses 12 may obtain an image of the lecture stage and its surrounding scenario as a display scenario of the above target object image. The user may specify the display position as a lecture stage position in the display scenario through the client device 12, and the display position corresponds to the lecture stage position in the lecture hall where the user is located. Here, the user may set the display position of the depth image of the speaker 14 in the display scenario as the lecture stage position through the AR glasses 12.

In one or more examples, the client device 12 may receive a control instruction of a user-specified display position. a first implementation, the client device 12 may provide a plurality of candidate positions in the above display scenario for user selection. When the user selects one of the candidate positions, the client device 12 is considered to have received the control instruction of the user-specified display position and determines the user-selected candidate position as the user-specified display position. In a second implementation, the client device 12 may provide the above display scenario and provide a rectangular box for encircling the display position on the display scenario, and the user may send the control instruction for specifying the display position to the client device 12 through the rectangular box and an "OK" button on the client device 12. For example, after dragging the rectangular box to one position in the display scenario, the user may press the "OK" button on the client device 12 to determine the current position encircled by the rectangular box as the display position. In a practical application, the client device 12 may receive the control instruction of the user-specified display position in another manner, which is not limited herein.

In one or more examples, after receiving the control instruction of the user-specified display position, the client device 12 may obtain a photographing direction for photographing a target object by querying a pre-stored corresponding relationship between the display position and the photographing direction according to the user-specified display position. In the corresponding relationship between the display position and the photographing direction, the photographing direction is determined according to a relative position relationship between the position of the client device and the display position. That is, in the corresponding relationship between the display position and the photographing direction, the display position is in a one-to-one correspondence with the photographing direction, and a photographing direction corresponding to one display position is determined according to the relative position relationship between the display position and the position of the client device. In the above example, the photographing direction may be determined according to the relative position relationship between the position of the client device and an actual position that is in a place where the client device is located and corresponds to the user-specified display position.

TABLE 1

| Display position | Photographing direction |
| --- | --- |
| Position 43 | D1 |
| Position 44 | D2 |

Referring to Table 1, the client device 12 pre-stores the corresponding relationship of the photographing direction D1 and the position 43 when the position 43 is used as the display position and the corresponding relationship of the photographing direction D2 and the position 44 when the position 44 is used as the display position. The photographing direction D1 is determined according to a relative position relationship between the position of the client device 12 and the position 43. The photographing direction D2 is determined according to a relative position relationship between the position of the client device 12 and the position 44.

Figure 4:
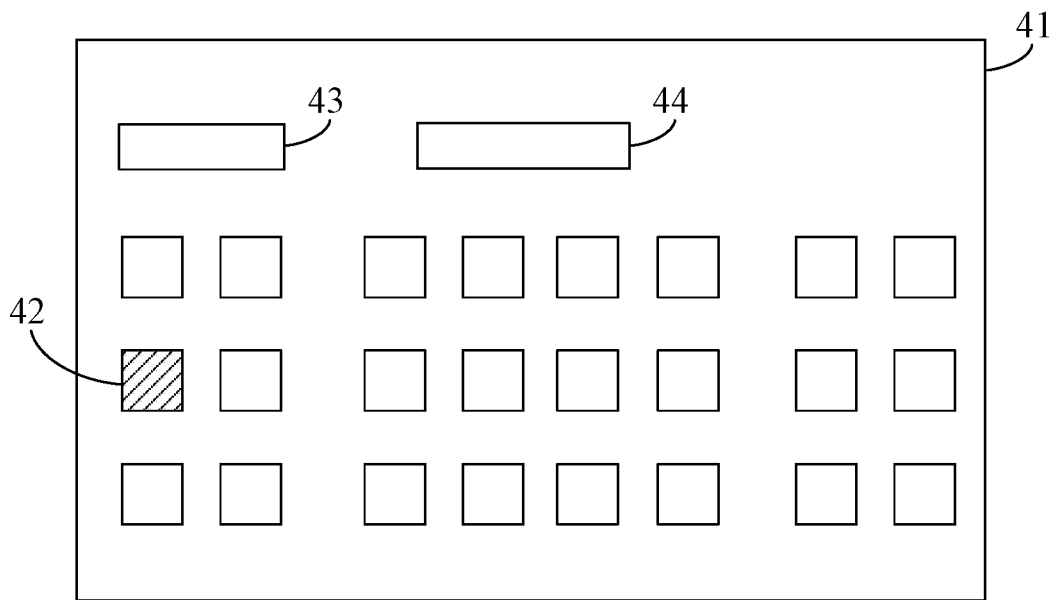
FIG. 4 is a schematic diagram illustrating an application scenario of a method of controlling image display according to an example of the present disclosure.

In an illustrative scenario, as shown in FIG. 4, a user sits on a seat 42 in a lecture hall 41, and the position of the seat 42 corresponds to the above position of the client device 12. The user may select one position from the candidate positions 43 and 44 as the display position. The position 44 is a lecture stage position, for example, the user may select the position 44 as the specified display position. After receiving a control instruction, the client device 12 may obtain the photographing direction D2 corresponding to the user-specified display position 44 by querying Table 1 according to the user-specified display position 44.

In this example, the client device 12 may generate an image capture instruction according to the above photographing direction and send the image capture instruction to the server 11, so that the server 11 may perform image capture by controlling an image capture device 13 according to the photographing direction. Therefore, the server 11 may obtain a depth image including a target object 14, thereby extracting the target object image from the depth image.

In this example, after receiving the image capture instruction from the client device 12, the server 11 may obtain the depth image including the target object 14 by controlling the image capture device 13 to perform image capture according to the photographing direction carried in the image capture instruction. In an example, the image capture device 13 may include at least one camera; the server 11 may pre-store a first corresponding relationship between a device identifier of the at least one camera and the photographing direction. The server 11 may obtain the device identifier of the camera corresponding to the photographing direction carried in the image capture instruction according to the first corresponding relationship, and obtain the depth image including the target object 14 by controlling the camera to perform image capture for the target object according to the obtained device identifier of the camera.

In an illustrative scenario, as shown in FIG. 1, the image capture device 13 includes three cameras 131, 132 and 133. The cameras 131, 132 and 133 may be binocular cameras for capturing depth images. The server 11 pre-stores corresponding relationships between device identifiers C01, C02 and C03 of the cameras 131, 132 and 133 and photographing directions, for example, as shown in Table 2. An image of a front side of a target object may be obtained by photographing in a photographing direction D1, an image of a left-front side of the target object may be obtained by photographing in a photographing direction D2, an image of a right side of the target object may be obtained by photographing in a photographing direction D3, an image of a left side of the target object may be obtained by photographing in a photographing direction D4, an image of a right-front side of the target object may be obtained by photographing in a photographing direction D5, and an image including the left, front and right sides of the target object may be obtained by photographing in a photographing direction D6.

TABLE 2

| Device identifier | Photographing direction |
|---|---|
| C01 | D1 |
| C02 | D3 |
| C03 | D4 |
| C01, C02 | D5 |
| C01, C03 | D2 |
| C01, C02, C03 | D6 |

For example, referring to FIG. 4, if the user sits on the seat 42 in the lecture hall 41 and the user-specified display position is the position 43, the client device 12 may determine the photographing direction D1 according to the relative position relationship between the seat 42 and the position 43. The client device 12 may send the image capture instruction carrying the photographing direction D1 to the server 11. The server 11 may obtain the device identifier C01 corresponding to the photographing direction D1 by querying Table 2 according to the photographing direction D1, and obtain one depth image including a target object image by controlling the camera 131 corresponding to the device identifier C01 to perform image capture.

In an example, the image capture device 13 may upload the captured depth image including the target object image to the server, and the server may extract the target object image from the depth image. In an example, in order to highlight or emphasize the target object image (other parts in the depth image may be blurred or neglected at the same time), the server 11 may obtain a corresponding image region in the depth image according to the photographing direction of the depth image and extract the target object image from the image region. Continuing the above example, the server 11 may obtain the image region corresponding to the photographing direction D1 in the depth image and extract the target object image from the image region. In this case, the target object image is equivalent to an image of the target object located at the lecture stage position 43 formed at eye ground of the user located at the position of the client device (i.e., the seat 42), thereby increasing a spatial sense of the target object image.

In this example, the server 11 sends the obtained target object image to the client device 12. After receiving the target object image from the server 11, the client device 12 displays the target object image at the user-specified display position. In the above example, the client device 12 may obtain a synthetic image by synthesizing the received target object image and the display scenario according to the display position, and then display the synthetic image.

In this example, since the depth image including the target object image is captured from the photographing direction determined by the relative position relationship between the position of the client device and the user-specified display position of the target object, rather than capturing a 360-degree omni-directional depth image for the target object, a data volume of the depth image is reduced. Further, the target object image extracted from the depth image is sent to the client device. In this case, a stereoscopic display effect of the target object is maintained and a data transmission amount of the image may also be reduced, thereby reducing a transmission cost of the image. Meanwhile, the photographing direction is determined according to the relative position relationship between the position of the client device and the user-specified display position of the target object, so that the target object image can reflect the relative position relationship between the display position and the position of the client device, thereby achieving a more vivid display effect, giving the user an immersive feeling, and improving a user experience.

In a practical application, at least two cameras with different photographing distances may exist in a same photographing direction of the target object. The client device may pre-store a corresponding relationship between the display position, the photographing direction and the photographing distance. The client device may obtain the photographing direction and the photographing distance both corresponding to the user-specified display position according to the corresponding relationship between the display position, the photographing direction and the photographing distance, and send an image capture instruction to the server according to the obtained photographing direction and the photographing distance. The server may also pre-store a corresponding relationship between the photographing direction, the photographing distance and a device identifier. The server may obtain the device identifier both corresponding to the photographing direction and the photographing distance carried in the image capture instruction according to the corresponding relationship between the photographing direction, the photographing distance and the device identifier, and control the camera corresponding to the obtained device identifier to perform image capture for the target object.

Figure 5:
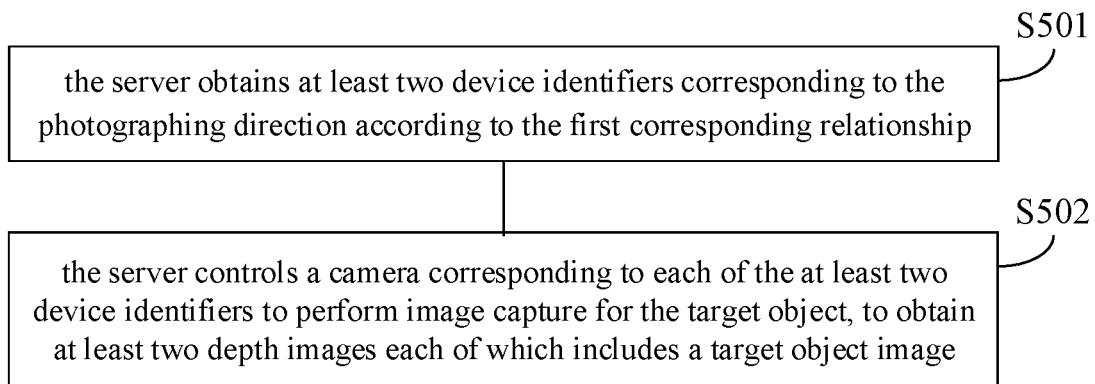
FIG. 5 and FIG. 6 are flowcharts illustrating a method of controlling image display executed by a server according to another example of the present disclosure.
Figure 6:
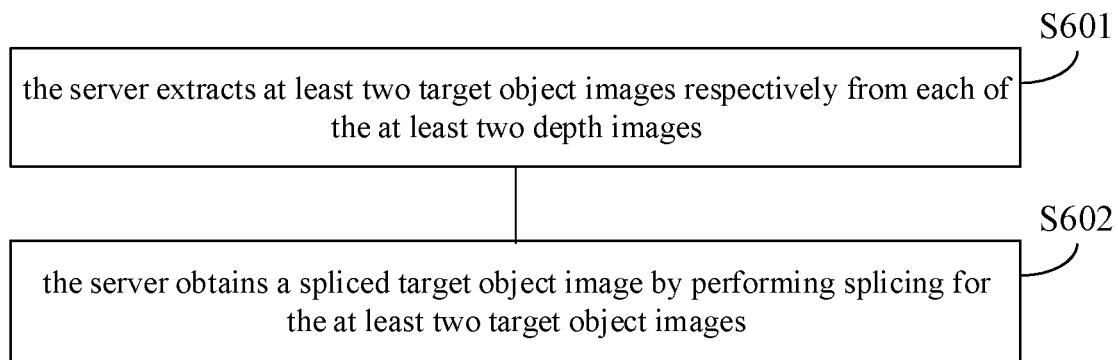

FIG. 5 and FIG. 6 are flowcharts illustrating a method of controlling image display executed by a server 11 according to another example of the present disclosure. Based on the example shown in FIG. 2, the server 11 pre-stores a first corresponding relationship between a device identifier of the at least one camera and a corresponding photographing direction. As shown in FIG. 1, the above block S202 includes the following blocks S501 and S502, and the above block S203 includes the following blocks S601 and S602.

At block S501, the server 11 obtains at least two device identifiers corresponding to the photographing direction according to the first corresponding relationship.

At block S502, the server 11 controls a camera corresponding to each of the at least two device identifiers to perform image capture for the target object, to obtain at least two depth images each of which includes a target object image.

At block S601, the server 11 extracts at least two target object images respectively from each of the at least two depth images.

At this block, since one depth image includes one target object image, the server 11 may extract one corresponding target object image from each of the at least two depth images.

At block S602, the server 11 obtains a spliced target object image by performing splicing for the at least two target object images.

In this example, the server can obtain at least two device identifiers corresponding to the photographing direction according to the first corresponding relationship, and obtain at least two depth images each including a target object image by controlling a camera corresponding to each of the at least two device identifiers to perform image capture for the target object. For example, as shown in FIG. 4, if the user sits on the seat 42 and the user-specified display position is the position 44, the client device 12 determines the photographing direction D2 according to a relative position relationship between the seat 42 and the display position 44, and the photographing direction carried in the image capture instruction sent from the client device 12 to the server 11 is D2. The server 11 can obtain device identifiers C01 and C03 by querying Table 2 according to the photographing direction D2, and obtain depth images P01 and P02 including target object images by controlling cameras 131 and 133 corresponding to the device identifiers C01 and C03 respectively to perform image capture. The depth image P01 is captured by the camera 131 corresponding to the device identifier C01, and the depth image P02 is captured by the camera 133 corresponding to the device identifier C03.

In this example, after obtaining at least two depth images including target object images, the server extracts the target object images from the at least two depth images, and then obtains the spliced target object image by performing splicing for the extracted at least two target object images. Continuing the above example, the server 11 extracts a target object image 1 from the depth image P01 and a target object image 2 from the depth image P02 respectively. Then, the server 11 obtains the spliced target object image by performing splicing for the target object image 1 and the target object image 2.

In an example, the server 11 may obtain a target object image from a depth image including the target object image in a manner as follows: obtaining an image region corresponding to a photographing direction in the depth image according to the photographing direction adopted when the depth image is taken, and extracting the target object image from the image region of the depth image. Continuing the above example, the server 11 obtains the corresponding photographing directions D1 and D4 by querying Table 2 according to the device identifiers C01 and C03, that is, the photographing directions D1 and D4 corresponding to the depth image P01 and the depth image P02 respectively are obtained. The server 11 obtains an image region A1 corresponding to the photographing direction D1 in the depth image P01 and an image region A2 corresponding to the photographing direction D4 in the depth image P02, and then, extracts the target object image 1 from the image region A1 and the target object image 2 from the image region A2.

In this example, when at least two cameras are determined to perform image capture for the target object according to the user-specified display position and when at least two depth images including target object images are obtained, the target object images may be extracted from the at least two depth images according to the photographing direction. Then, the spliced target object image may be obtained for display at the display position by performing splicing for the at least two target object images, thereby extending a range of the user-specified display position and increasing practicability.

It is to be noted that, in a case that at least two cameras are known to be used to photograph the target object, the target object images are extracted respectively along photographing directions corresponding to a plurality of cameras by re-using Table 2 rather than extracted along one composite photographing direction corresponding to a plurality of cameras. Therefore, the image corresponding to the photographed target object can be extracted more accurately in this manner.

Figure 7:
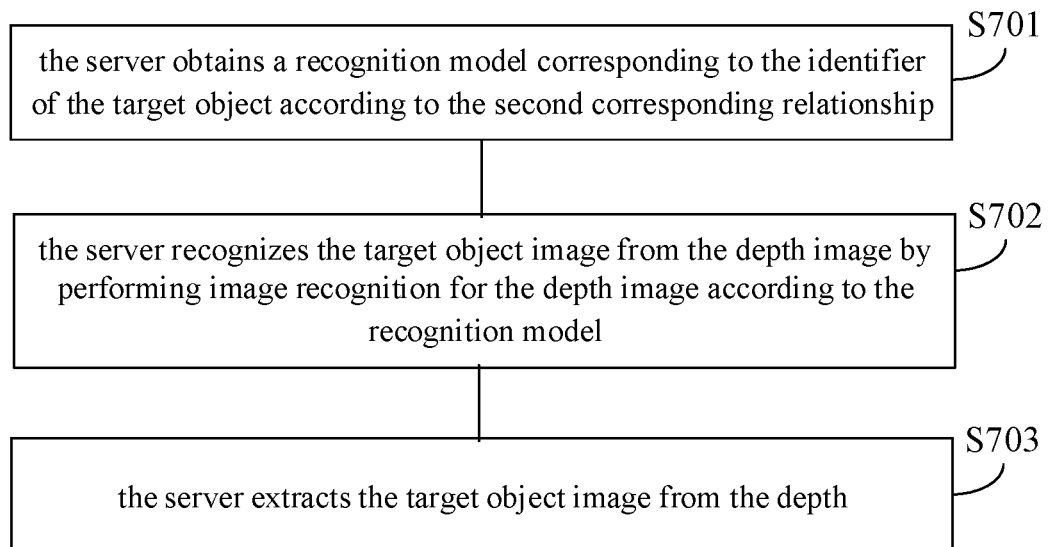
FIG. 7 is a flowchart illustrating a method of controlling image display executed by a server according to still another example of the present disclosure.

FIG. 7 is a flowchart illustrating a method of controlling image display executed by a server 11 according to still another example of the present disclosure. In this example, based on the example shown in FIG. 2, referring to FIG. 7, since a control instruction also includes an identifier of a target object, an image capture instruction also includes the identifier of the target object. The server 11 also pre-stores a second corresponding relationship between the identifier of the target object and a recognition model of the target object. The above block S203 also includes the following blocks S701 to S703.

At block S701, the server 11 obtains a recognition model corresponding to the identifier of the target object according to the second corresponding relationship.

At block S702, the server 11 recognizes the target object image from the depth image by performing image recognition for the depth image according to the recognition model.

At block S703, the server 11 extracts the target object image from the depth image.

In this example, the user may also specify a target object through a client device. For example, the client device may receive a control instruction of a user-specified display position and a user-specified target object, and the control instruction includes the user-specified display position and an identifier of the user-specified target object. The client device may determine a photographing direction according to the user-specified display position, and then, send an image capture instruction carrying the photographing direction and the identifier of the target object to the server.

In this example, the server 11 pre-stores a second corresponding relationship between the identifier of the target object and the recognition model. The server may obtain the recognition model corresponding to the identifier of the target object carried in the image capture instruction by querying the second corresponding relationship based on the identifier of the target object carried in the image capture instruction, recognize the target object image from the depth image by performing image recognition for the depth image according to the obtained recognition model, and then extract the target object image from the depth image. Therefore, the image of the user-specified target object may be extracted from the depth image, thereby effectively increasing pertinence of the target object image.

Figure 8:
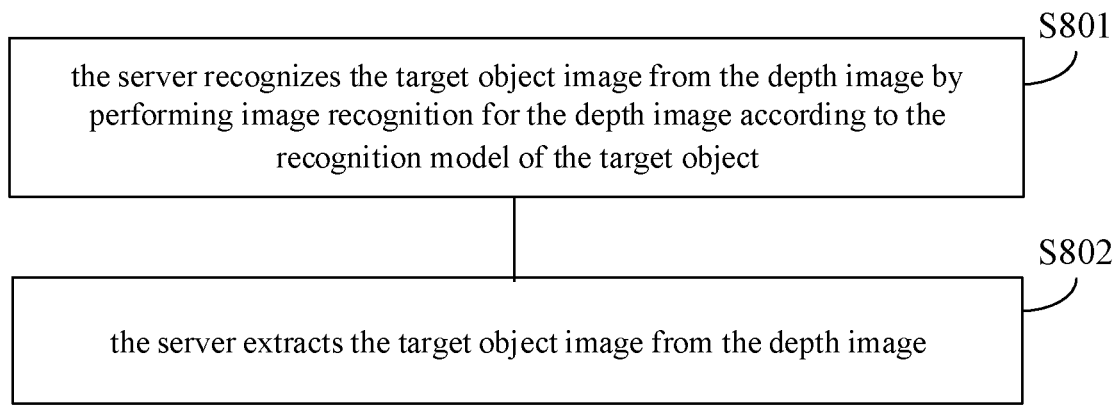
FIG. 8 is a flowchart illustrating a method of controlling image display executed by a server according to yet another example of the present disclosure.

FIG. 8 is a flowchart illustrating a method of controlling image display executed by a server 11 according to yet another example of the present disclosure. In this example, the server 11 pre-stores a recognition model for recognizing a target object. Based on the example shown in FIG. 2, referring to FIG. 8, the above block S203 includes the following blocks S801 and S802.

At block S801, the server 11 recognizes the target object image from the depth image by performing image recognition for the depth image according to the recognition model of the target object.

At block S802, the server 11 extracts the target object image from the depth image.

In this example, the server 11 pre-stores a recognition model for recognizing a target object as a default recognition model. After obtaining the depth image including the target object image, the server 11 may perform image recognition for the depth image according to the above default recognition model, identify the target object image in the depth image, and extract the identified target object image from the depth image. In this case, the user may only need to specify the display position of the target object image, thereby simplifying user operations and effectively improving convenience.

Figure 9:
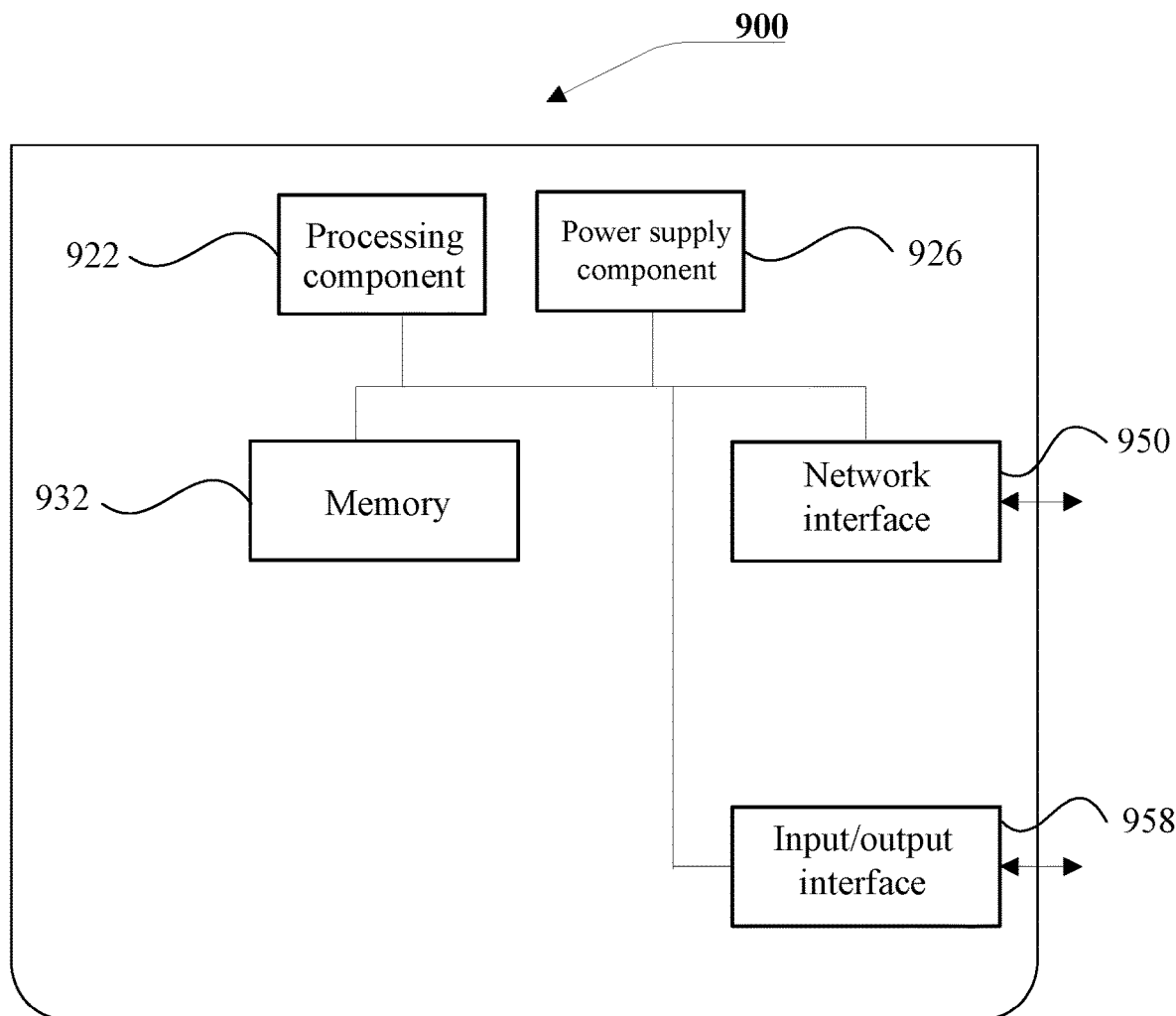
FIG. 9 is a block diagram illustrating an apparatus for controlling image display according to an example of the present disclosure.

As shown in FIG. 9, an apparatus 900 may be provided as a server. Referring to FIG. 9, the apparatus 900 includes a processing component 922 and a memory resource represented by a memory 932.

The processing component 922 may include one or more processors. The memory 932 is used to store instructions, for example, an application, executable by the processing component 922. The application stored in the memory 932 may include one or more modules, and each module corresponds to a set of instructions.

Further, the processing component 922 is configured to execute instructions to: receive an image capture instruction sent by a client device, where the image capture instruction includes a photographing direction, and the photographing direction is determined by the client device according to a relative position relationship between a position of the client device and a user-specified display position; control an image capture device to perform image capture according to the photographing direction, to obtain a depth image including a target object image; extract the target object image from the depth image; and send the target object image to the client device so that the client device displays the target object image at the display position.

In an example, the memory 932 is configured to: pre-store a first corresponding relationship between a device identifier of at least one camera and a corresponding photographing direction. In this case, the processing component 922 obtains a device identifier corresponding to the photographing direction according to the first corresponding relationship stored in the memory 932, and controls a camera corresponding to the device identifier to perform image capture for the target object, to obtain one depth image including a target object image.

In an example, the processing component 922 is configured to: obtain a corresponding image region in the depth image according to the photographing direction, and extract the target object image from the image region.

In an example, the memory 932 is configured to: pre-store a first corresponding relationship between a device identifier of at least one camera and a corresponding photographing direction. In this case, the processing component 922 is configured to: obtain at least two device identifiers corresponding to the photographing direction according to the photographing direction and the first corresponding relationship stored in the memory 932; control a camera corresponding to the at least two device identifiers to perform image capture for the target object, to obtain at least two depth images each including a target object image; extract at least two target object images from the at least two depth images; and obtain a spliced target object image by performing splicing for the at least two target object images.

In an example, the processing component 922 is configured to: obtain corresponding image regions in the at least two depth images according to the photographing directions corresponding to the at least two depth images respectively, and extract at least two target object images from the corresponding image regions in the at least two depth images.

In an example, the memory 932 is configured to: pre-store a second corresponding relationship between an identifier of the target object and a recognition model of the target object. In this case, the processing component 922 is configured to: obtain the recognition model corresponding to the identifier according to the second corresponding relationship stored in the memory 932; and recognize and extract the target object image from the depth image by performing image recognition for the depth image according to the recognition model.

In an example, the memory 932 is configured to: pre-store a recognition model for recognizing the target object. In this case, the processing component 922 is configured to: recognize and extract the target object image from the depth image by performing image recognition for the depth image according to the recognition model of the target object stored in the memory 932.

The apparatus 900 may also include a power supply component 926, a wired/wireless network interface 950 and an input/output (I/O) interface 958. The power supply component 926 is configured to execute power supply management of the apparatus 900. The network interface 950 is configured to connect the apparatus 900 to a network. The apparatus 900 may operate based on an operating system, such as Windows Server™, Mac OS X™, Unix™, Linux™, FreeBSD™ or the like, stored in the memory 932.

In some examples of the present disclosure, a non-transitory computer readable storage medium including instructions, such as the memory 932 including instructions, is further provided. The instructions may be executed by the processing component 922 of the apparatus 900 to complete the above method. For example, the non-transitory computer readable storage medium may be a Read-Only Memory (ROM), a Random Access Memory (RAM), a CD-ROM, a magnetic tape, a floppy disk and an optical data storage device, etc.

Figure 10:
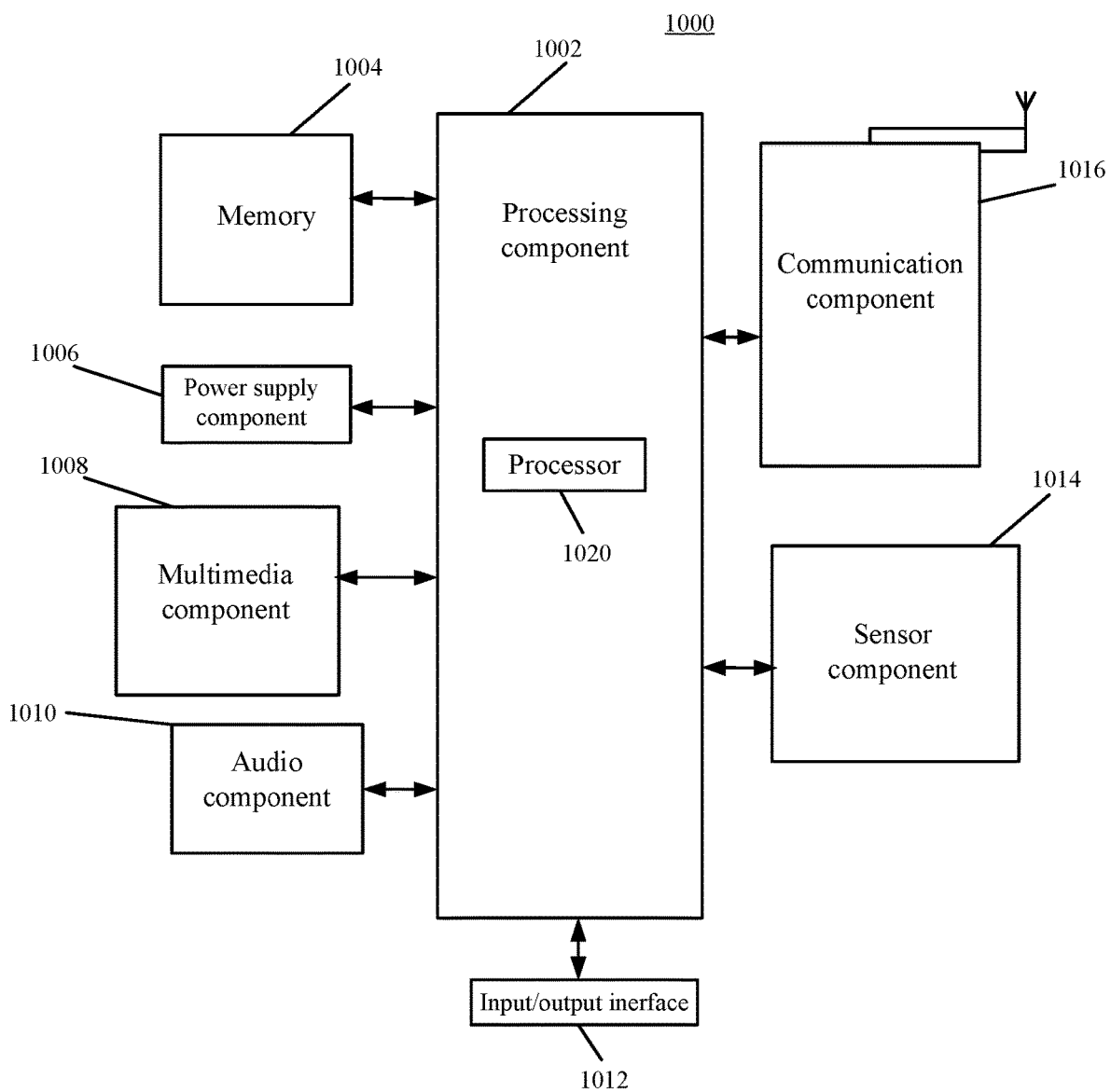
FIG. 10 is a block diagram illustrating an apparatus for controlling image display according to an example of the present disclosure.

As shown in FIG. 10, an apparatus 1000 may be AR glasses, a mobile phone, a computer, a tablet device, a medical device, a fitness device, a personal digital assistant and the like.

Referring to FIG. 10, the apparatus 1000 may include one or more of the following components: a processing component 1002, a memory 1004, a power supply component 1006, a multimedia component 1008, an audio component 1010, an input/output (I/O) interface 1012, a sensor component 1014, and a communication component 1016.

The memory 1004 is used to store a computer program. The processing component 1002 is used to execute the computer program stored in the memory 1004 and configured to: receive a control instruction including a user-specified display position; obtain a photographing direction for photographing a target object according to the display position and a corresponding relationship between the display position and the photographing direction, where the photographing direction is determined according to a relative position relationship between a position of a client device and the display position; send an image capture instruction to a server according to the photographing direction, so that the server obtains a depth image including the target object image according to the image capture instruction and extract the target object image from the depth image; and receive the target object image sent by the server and display the target object image at the display position.

In an example, the control instruction also includes an identifier of a target object, and the image capture instruction also includes the identifier of the target object, so that the server can extract the target object image from the depth image according to the identifier of the target object.

The processing component 1002 usually controls overall operations of the apparatus 1000, such as operations related to display, a telephone call, data communication, a camera operation and a record operation. The processing component 1002 may include one or more processors 1020 for executing instructions to complete all or a part of blocks of the above method. Further, the processing component 1002 may include one or more modules to facilitate interaction between the processing component 1002 and another component. For example, the processing component 1002 may include a multimedia module to facilitate the interaction between the multimedia component 1008 and the processing component 1002.

The memory 1004 is configured to store different types of data to support operations at the apparatus 1000. Examples of such data include instructions, contact data, phonebook data, messages, pictures, videos, and so on for any application or method that operates on the apparatus 1000. The memory 1004 may be implemented by any type of volatile or non-volatile memory devices or a combination thereof, and the memory 1004 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power supply component 1006 supplies power for different components of the apparatus 1000. The power supply component 1006 may include a power supply management system, one or more power supplies, and other components associated with generating, managing and distributing power for the apparatus 1000.

The multimedia component 1008 includes a screen for providing an output interface between the apparatus 1000 and a user. In some examples, the screen may include a Liquid Crystal Display (LCD) and a Touch Panel (TP). If the screen includes a touch panel, the screen may be implemented as a touch screen for receiving an input signal from a user. The touch panel may include one or more touch sensors for sensing a touch, a slide and a gesture on the touch panel. The touch sensor may not only sense a boundary of a touching or sliding movement, but also detect duration and pressure related to the touching or sliding operation. In some examples, the multimedia component 1008 may include a front camera and/or a rear camera. When the apparatus 1000 is in an operation mode, such as a shooting mode or a video mode, the front camera and/or the rear camera may receive external multimedia data. Each of the front camera and the rear camera may be a fixed optical lens system or be of a focal length and a capability of an optical zoom.

The audio component 1010 is configured to output and/or input an audio signal. For example, the audio component 1010 includes a microphone (MIC). When the apparatus 1000 is in an operation mode, such as a call mode, a record mode and a voice recognition mode, the microphone is configured to receive an external audio signal. The received audio signal may be further stored in the memory 1004 or sent via the communication component 1016. In some examples, the audio component 1010 also includes a speaker for outputting an audio signal.

The I/O interface 1012 provides an interface between the processing component 1002 and a peripheral interface module. The above peripheral interface module may be a keyboard, a click wheel, a button, or the like. These buttons may include but not limited to, a home button, a volume button, a start button and a lock button.

The sensor component 1014 includes one or more sensors for providing state assessments in different aspects for the apparatus 1000. For example, the sensor component 1014 may detect an on/off state of the apparatus 1000 and a relative location of components. For example, the components are a display and a keypad of the apparatus 1000. The sensor component 1014 may also detect a position change of the apparatus 1000 or a component of the apparatus 1000, presence or absence of a touch of a user on the apparatus 1000, an orientation or acceleration/deceleration of the apparatus 1000, and a temperature change of apparatus 1000. The sensor component 1014 may include a proximity sensor for detecting the existence of a nearby object without any physical touch. The sensor component 1014 may also include an optical sensor, such as a CMOS or CCD image sensor used in an imaging application. In some examples, the sensor component 1014 may also include an acceleration sensor, a gyro sensor, a magnetic sensor, a pressure sensor, or a temperature sensor.

The communication component 1016 is configured to facilitate wired or wireless communication between the apparatus 1000 and other devices. The apparatus 1000 may access a wireless network based on a communication standard, such as WiFi, 2G or 3G, or a combination thereof. In an example, the communication component 1016 receives a broadcast signal or broadcast related information from an external broadcast management system via a broadcast channel. In an example, the communication component 1016 may also include a Near Field Communication (NFC) module for promoting short-range communication. For example, the NFC module may be implemented based on radio frequency identification (RFID) technology, infrared data association (IrDA) technology, ultra-wideband (UWB) technology, Bluetooth (BT) technology and other technologies.

In an example, the apparatus 1000 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic elements, for executing the method in any one of the above examples.

In an example, a non-transitory computer readable storage medium including instructions, such as the memory 1004 including instructions, is also provided. The above instructions may be executed by the processor 1020 of the apparatus 1000 to complete the above method. For example, the non-transitory computer readable storage medium may be a Read-Only Memory (ROM), a Random Access Memory (RAM), a CD-ROM, a magnetic tape, a floppy disk and an optical data storage device, etc.

Optionally, the image capture device includes at least one camera, and the method further includes: pre-storing a first corresponding relationship between a device identifier corresponding to each of the at least one camera and a photographing direction. In this case, controlling the image capture device to perform image capture according to the photographing direction to obtain the depth image comprising the target object image includes: obtaining a device identifier corresponding to the photographing direction according to the first corresponding relationship; and controlling a camera corresponding to the device identifier to perform image capture for the target object, to obtain one depth image including a target object image.

Optionally, extracting the target object image from the depth image includes: obtaining a corresponding image region in the depth image according to the photographing direction; and extracting the target object image from the image region.

Optionally, the image capture device includes at least one camera, and the method further includes: pre-storing a first corresponding relationship between a device identifier corresponding to each of the at least one camera and a photographing direction. In this case, controlling the camera corresponding to each of the at least two device identifier to perform image capture for the target object, to obtain one depth image including a target object image includes: obtaining at least two device identifiers corresponding to the photographing direction according to the photographing direction and the first corresponding relationship; and controlling a camera corresponding to each of the at least two device identifiers to perform image capture for a target object, to obtain at least two depth images each of which includes target object images; and, extracting the target object images from the depth images includes: extracting at least two target object images respectively from each of the at least two depth images; and obtaining a spliced target object image by performing splicing for the at least two target object images.

Optionally, extracting the at least two target object images respectively from each of the at least two depth images includes: obtaining corresponding image regions in the at least two depth images according to the photographing direction corresponding to the at least two depth images respectively; and extracting the at least two target object images from the corresponding image regions in the at least two depth images.

In an example, the image capture instruction includes an identifier of a target object, and the method further includes: pre-storing a second corresponding relationship between the identifier of the target object and a recognition model of the target object. In this case, extracting the target object image from the depth image includes: obtaining the recognition model corresponding to the identifier according to the second corresponding relationship; and recognizing and extracting the target object image from the depth image by performing image recognition for the depth image according to the recognition model.

Optionally, the method further includes: pre-storing a recognition model for recognizing a target object. In this case, extracting the target object image from the depth image includes: recognizing and extracting the target object image from the depth image by performing image recognition for the depth image according to the recognition model of the target object.

Optionally, the control instruction further includes an identifier of the target object, and the image capture instruction further includes the identifier of the target object so that the server can extract the target object image from the depth image according to the identifier of the target object.

After considering the specification and practicing the present disclosure, the persons of skill in the prior art may easily conceive of other implementations of the present disclosure. The present disclosure is intended to include any variations, uses and adaptive changes of the present disclosure. These variations, uses and adaptive changes follow the general principle of the present disclosure and include common knowledge or conventional technical means in the prior art not disclosed in the present disclosure. The specification and examples herein are intended to be illustrative only and the real scope and spirit of the present disclosure are indicated by the following claims of the present disclosure.

It is to be understood that the present disclosure is not limited to the precise structures described above and shown in the accompanying drawings and may be modified or changed without departing from the scope of the present disclosure. The scope of protection of the present disclosure is limited only by the appended claims.

After considering the specification and practicing the present disclosure, the persons of skill in the prior art may easily conceive of other implementations of the present disclosure. The present disclosure is intended to include any variations, uses and adaptive changes of the present disclosure. These variations, uses and adaptive changes follow the general principle of the present disclosure and include common knowledge or conventional technical means in the prior art not disclosed in the present disclosure. The specification and examples herein are intended to be illustrative only and the real scope and spirit of the present disclosure are indicated by the following claims of the present disclosure.

It is to be understood that the present disclosure is not limited to the precise structures described above and shown in the accompanying drawings and may be modified or changed without departing from the scope of the present disclosure. The scope of protection of the present disclosure is limited only by the appended claims.

What is claimed is:

1. A method of controlling image display, the method being applied to a server, comprising:
   receiving an image capture instruction from a client device, wherein the image capture instruction comprises a photographing direction, and the photographing direction is determined by the client device according to a relative position relationship between a position of the client device and a user-specified display position;
   controlling an image capture device to perform image capture according to the photographing direction, to obtain a depth image comprising a target object image;
   extracting the target object image from the depth image; and
   sending the target object image to the client device such that the client device displays the target object image at the user-specified display position,
   wherein the image capture device comprises at least one camera, and the method further comprises:
      pre-storing a first corresponding relationship between a device identifier corresponding to each of the at least one camera and a photographing direction; and
   wherein controlling the image capture device to perform image capture according to the photographing direction, to obtain the depth image comprising the target object image comprises:
      obtaining at least two device identifiers corresponding to the photographing direction according to the photographing direction and the first corresponding relationship; and
      controlling a camera corresponding to each of the at least two device identifiers to perform image capture for a target object, to obtain at least two depth images each of which comprises the target object image.

2. The method of claim 1,
   wherein extracting the target object image from the depth image comprises:
   extracting at least two target object images respectively from the at least two depth images; and
   obtaining a spliced target object image by performing splicing for the at least two target object images.

3. The method of claim 2, wherein extracting the at least two target object images respectively from each of the at least two depth images comprises:
   obtaining corresponding image regions in the at least two depth images according to the photographing directions corresponding to the at least two depth images respectively; and
   extracting the at least two target object images from the corresponding image regions in the at least two depth images.

4. The method of claim 1, further comprising:
   pre-storing a recognition model for recognizing the target object;
   wherein extracting the target object image from the depth image comprising:

recognizing and extracting the target object image from the depth image by performing image recognition for the depth image according to the recognition model of the target object.

5. An apparatus for controlling image display, comprising:
a memory configured to store a computer program; and
a processor coupled with the memory and configured to execute the computer program stored in the memory and configured to:
receive an image capture instruction from a client device, wherein the image capture instruction comprises a photographing direction, and the photographing direction is determined by the client device according to a relative position relationship between a position of the client device and a user-specified display position;
control an image capture device to perform image capture according to the photographing direction, to obtain a depth image comprising a target object image;
extract the target object image from the depth image; and
send the target object image to the client device such that the client device displays the target object image at the user-specified display position,
wherein the image capture device comprises at least one camera;
wherein the memory is configured to pre-store a first corresponding relationship between a device identifier corresponding to each of the at least one camera and a photographing direction; and
wherein the processor is configured to:
obtain at least two device identifiers corresponding to the photographing direction according to the photographing direction and the first corresponding relationship stored in the memory; and
control a camera corresponding to each of the at least two device identifiers to perform image capture for a target object, to obtain at least two depth images each of which comprises the target object image.

6. The apparatus of claim 5,
wherein the processor is configured to:
extract at least two target object images respectively from the at least two depth images; and
obtain a spliced target object image by performing splicing for the at least two target object images.

7. The apparatus of claim 6, wherein the processor is configured to:
obtain corresponding image regions in the at least two depth images according to the photographing directions corresponding to the at least two depth images respectively; and
extract the at least two target object images from the corresponding image regions in the at least two depth images.

8. The apparatus of claim 5, wherein the memory is configured to pre-store a recognition model for recognizing the target object; and
wherein the processor is configured to: recognize and extract the target object image from the depth image by performing image recognition for the depth image according to the recognition model of the target object stored in the memory.

9. A non-transitory computer readable storage medium storing a computer program, wherein the computer program is executed by a processor to implement the method of claim 1.

* * * * *